Figure 2B:
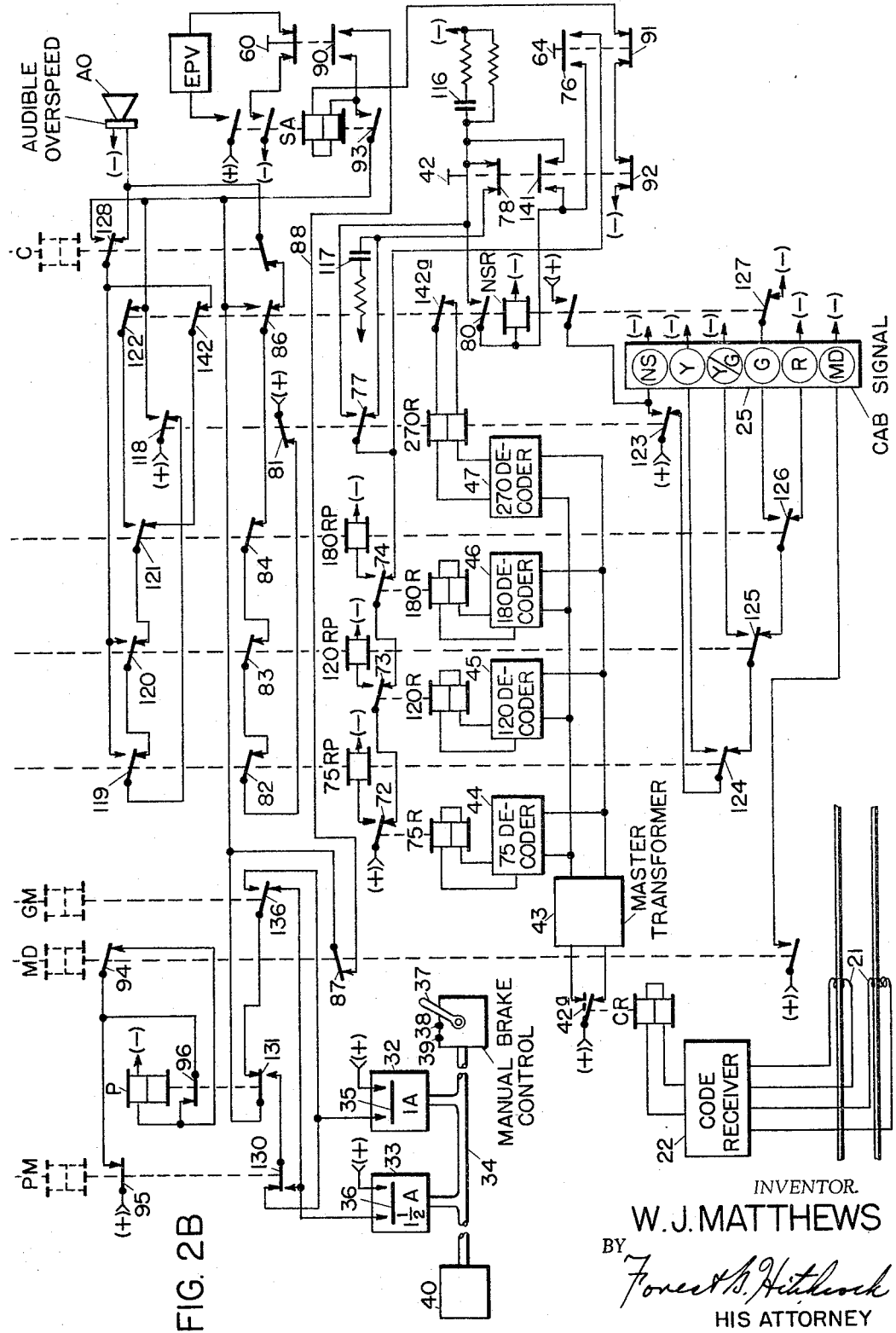

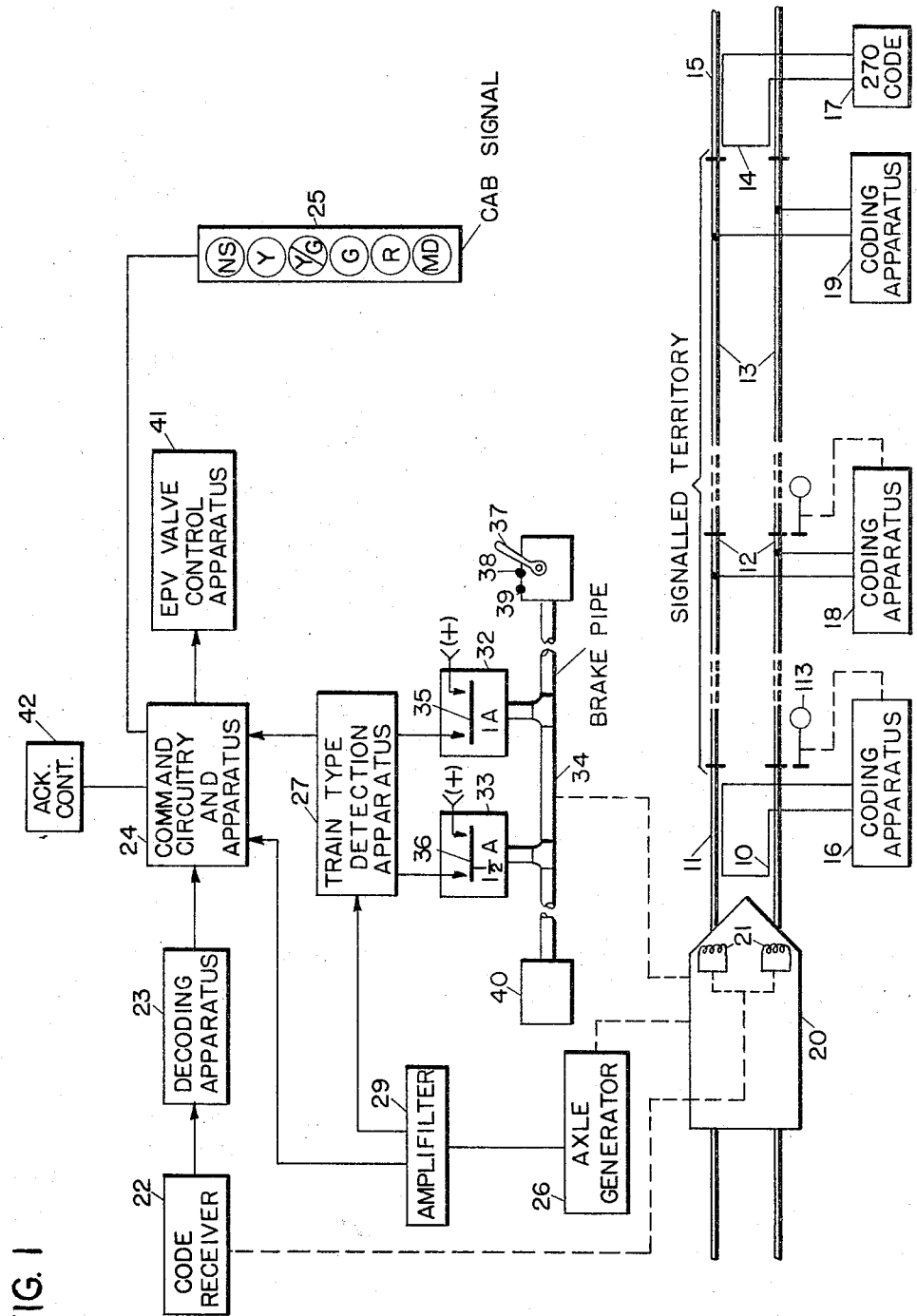

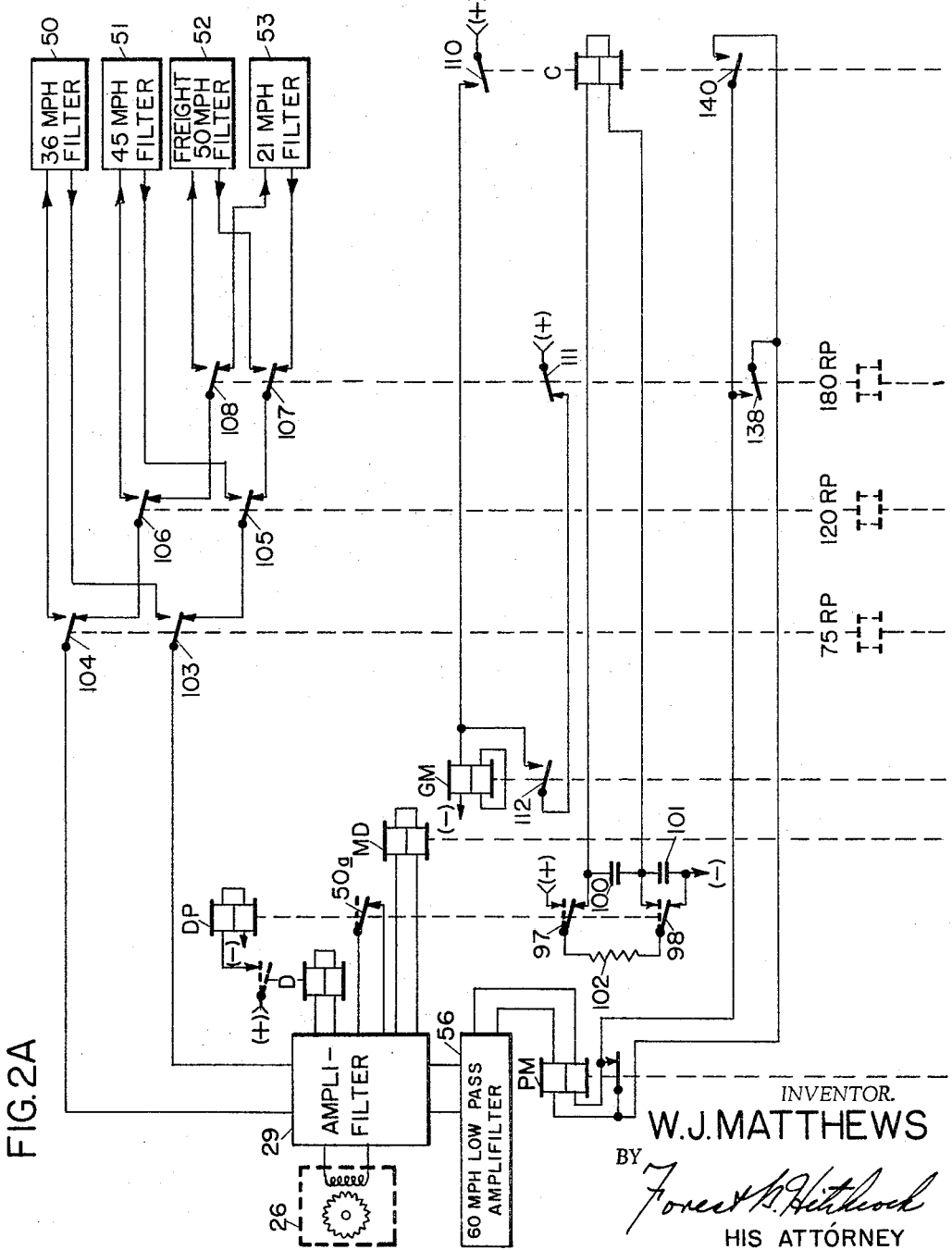

Aug. 23, 1966 W. J. MATTHEWS 3,268,726
TRAIN CONTROL SYSTEM
Filed April 4, 1963 3 Sheets-Sheet 3

INVENTOR.
W. J. MATTHEWS
BY
Forest B. Hitchcock
HIS ATTORNEY

United States Patent Office
3,268,726
Patented August 23, 1966

3,268,726
TRAIN CONTROL SYSTEM
William J. Matthews, Rochester, N.Y., assignor to General Signal Corporation, Rochester, N.Y., a corporation of New York
Filed Apr. 4, 1963, Ser. No. 270,752
7 Claims. (Cl. 246—182)

The present invention relates to an improved train control system for railroads, and more particularly to a system of the type having means for suppressing a penalty brake application.

In continuous train control systems, the authorized speed of a train is controlled in accordance with traffic and other wayside considerations by a code rate that is impressed on the track rails or on a wayside loop as the case may be. The locomotive carried apparatus continually detects the presence of a particular code, and through suitable decoding and cab signalling apparatus informs the operator of the speed at which the train is required to operate. If the actual speed of the train exceeds the required speed as governed by the particular code rate the operator must reduce the speed of the train in order to prevent a penalty brake application.

On railroads using a continuous inductive train control system, the controls are so constituted that the longest heaviest train that is to use the tracks can stop within a predetermined distance, and the penalty brake application is suppressed only if the speed of the train decreases to the authorized speed in a predetermined time. In these systems, if both heavy freight trains and light passenger trains travel in the same controlled territory, the efficiency of the passenger train is reduced because, it is required to reduce its speed in response to a restrictive code in the same manner as the longest, heaviest freight train, and may have to travel at a reduced speed for considerable distances when a greater speed would be far within the limits of safety.

Conventional braking systems for railroad trains are controlled by the air pressure in a brake pipe that extends the length of a train. When the brakes are in a released condition, the brake-pipe is charged with a predetermined amount of air pressure. If the operator reduces this pressure by operating a suitable brake lever on the locomotive, the brakes are applied to a degree commensurate with the amount this predetermined pressure is reduced. Thus, to reduce the speed of a long heavily loaded freight train in a relatively short distance, requires a greater reduction in the brake pipe pressure or in other words a greater degree of braking than to reduce the speed of a passenger train in the same distance. It follows that if a passenger train and a freight train are travelling at the same rate of speed, the passenger train can reduce its speed a greater amount in a shorter distance than the freight train in response to the same reduction in brake pressure, or degree of braking.

One of the objects of the present invention is to provide an improved train control system which provides for the safe and efficient operation of both passenger and freight trains.

Another object of this invention is to provide an improved train control system which provides for detecting whether the locomotive is pulling a passenger or freight train, and such detection determines the degree of braking required to forestall a penalty brake application.

A further object of this invention is to provide an improved system of the type hereinafter described wherein the train may be operated in both signalled and non-signalled territory.

A still further object of this invention is to provide an improved continuous inductive train control system of the type and having the features hereinafter described which is reliable and safe in operation.

Another object of this invention is to provide an improved train control system having means for detecting the type of train a locomotive is pulling and wherein the degree of braking required to suppress a penalty brake application is governed by the speed of the train the instant a restrictive code is received, and whether or not the locomotive is pulling a passenger or a freight train as detected by the system.

Other objects of this invention, will become apparent from the specification, the drawings, and the appended claims.

In the drawings:

FIG. 1 illustrates in block diagram an improved train control system in accordance with one embodiment of the present invention; and FIGS. 2A and 2B when placed one above the other illustrates diagrammatically and schematically the apparatus and circuitry of the system illustrated in FIG. 1.

Generally speaking, and without intending to limit the scope of the present invention the system is provided with means for detecting an attained maximum speed of the train since last starting up, and this information is stored on the locomotive. Under traffic and track conditions where the train is authorized to travel at maximum speed, a code rate of one hundred eighty, for example is transmitted to the locomotive and an appropriate aspect such as G is displayed on the cab signal. A passenger train will have a maximum authorized speed of sixty miles per hour or more for example. If a train is detected as having reached or exceeded an authorized maximum speed of sixty miles per hour for example, the system is governed so that a penalty brake application is suppressed in response to a degree of braking appropriate for a passenger train if the train is not exceeding the maximum speed when a restrictive control is received. If the train had not reached this sixty miles per hour speed but is traveling in excess of the authorized speed for a freight train when a restrictive control is received a penalty brake application is suppressed in response to a degree of braking appropriate for a freight train.

During operation, the actual speed of the train is compared with the commanded speed, which commanded speed is governed by the distinct code rate the locomotive is receiving. For example, if the locomotive apparatus is receiving a one hundred eighty code rate, the train is governed to travel at an authorized unrestricted speed and the lamp G of the cab signal is illuminated. If the locomotive is receiving a one hundred twenty code rate the train is required to travel less than fifty miles per hour, for example, and an appropriate aspect such as Y/G is displayed on the cab signal. If the locomotive is receiving a code rate of 75 for example, the train is restricted to not more than thirty-six miles per hour for example, and the cab signal displays a Y aspect. If the locomotive apparatus is receiving no code and is traveling in signalled territory, the train cannot exceed twenty-one miles per hour and the aspect R is displayed in the cab signal. The aspect NS notified the engineman the train is in non-signalled territory, and the aspect MD notified him that the train is in motion.

At the instant the train receives a more restrictive speed control, the means for comparing the required and actual speed determines whether or not braking is required in order to suppress a penalty brake application; and if required, the degree of braking, which must be effected by the engineman within a short time after receiving the more restrictive indication, is governed by the actual speed of the train when the restrictive indication is received together with the information stored on the locomotive as to the type of train that is being pulled. This degree of braking is sensed by suitable devices in communication with the pressure in the brake pipe so that the actual reduction in brake pipe pressure determines whether or not an adequate degree of braking has been effected. The system also provides the feature for travel into and out of coded or signalled territory without sacrificing any of the advantages inherent in the system according to the invention.

Referring to the drawings, and particularly to FIG. 1, the wayside apparatus includes a loop 10 positioned adjacent a track section 11 at the approach to coded or signalled territory, which territory is illustrated as including track sections 12 and 13. A loop 14 is positioned adjacent a section of track 15 at the end of the coded territory. The loop 10 is governed by conventional coding apparatus 16 to provide a selected code rate to govern the train at the approach to signalled territory. The loop 14 conducts current at a code rate of 270 as governed by the coding apparatus 17 to influence the locomotive carried apparatus in a distinctive manner as the train leaves the signalled territory. The code rate of track sections 12 and 13 is governed by conventional coding apparatus 18 and 19 in accordance with traffic conditions or other circumstances in accordance with the requirements of practice.

A locomotive referred to diagrammatically at 20 is provided with a pair of receivers 21 which are positioned to be inductively influenced by the code rate in the loops 10 and 14 at the entrance and exit end of the signalled territory, and to be influenced inductively by the code rate in the track sections 12 or 13 as the case may be when the locomotive is travelling in signalled territory. The code rates are received by a conventional code receiver 22 and decoded by suitable decoding apparatus 23. The decoding apparatus 23 provides a distinctive input in accordance with the code rate to a portion of the circuitry generally referred to at 24 for selectively illuminating particular aspects of a cab signal 25.

A conventional frequency generator 26 is connected in a well-known manner to the axle of the locomotive to produce a frequency which corresponds to the actual speed the locomotive 20 is traveling. This speed frequency is amplified by apparatus 29 and provides a control to another portion of the command circuitry and apparatus 24 and to the so-called train type detection apparatus generally referred to at 27. The input of the speed frequency to the apparatus 24 provides information to the command circuitry 24 so that the required or maximum permitted speed can be compared to the actual speed. The input to the detection apparatus 27 provides the information necessary for the apparatus 27 to compare the speed that the train has attained since last starting up with a predetermined fixed speed value.

The train type detection apparatus 27 also is responsive selectively to differential pressure switches 32 and 33, the pressure sides of which are in communication with a brake pipe referred to at 34. The pressure switch 32 has a contact 35 which closes when the pressure in the brake pipe is reduced one atmosphere, and if a brake pipe pressure is reduced one and one-half atmospheres, contact 36 on the pressure switch 33 closes. A conventional brake lever 37 when operated to position 38 reduces the pressure sufficiently to close contact 35, and when operated to position 39 also closes the contact 36. Conventional braking mechanism 40 connected to the brake pipe 34 applies the brakes of the train in a manner corresponding to the reduction in pressure in brake pipe 34.

The condition of the pressure switches 32 and 33 together with the train type information stored in the apparatus 27 provides a distinctive control to the command circuitry and apparatus 24, which in conjunction with the information from the decoding apparatus 23 and the amplifilter 29 governs the operation of conventional electropneumatic valve control apparatus 41 to apply a penalty brake application if an adequate degree of braking is not effected after receiving a more restrictive indication. Acknowledging contactor 42 is provided to govern the command circuitry 24 so as to require the operator to acknowledge the entry into and exit from the coded or signalled territory without receiving a penalty brake application.

Referring in detail to the circuitry and apparatus of FIGS. 2A and 2B the code receiver 22 controls the operation of a conventional coding relay CR to open and close its contact 42a at a rate corresponding to the code-rate received. This is sensed in a conventional manner by a master transformer 43 and a plurality of conventional decoders 44, 45, 46 and 47. The decoder 44 which is energized in response to a seventy-five code rate, causes the relay 75R to pick up thereby energizing the relay 75 RP by an obvious circuit. In the same manner the relays 120R and 120RP pick up when the decoder 45 is activated in response to a one-hundred twenty coderate; and, the relays 180R and 180RP pick up when the decoder 46 operates in response to a code-rate of one-hundred eighty. The relay 270R is energized in response to the operation of the decoder 47 in response to the reception of a two-hundred seventy code-rate.

The conventional axle driven frequency generator 26 (FIG. 2A) which is connected in a well known manner by a flexible cable to the axle of the locomotive 20 develops a frequency proportional to the locomotive speed. This frequency is conducted to the amplifilter 29. The amplifilter 29, includes a local oscillator which oscillates at a frequency of five kilocycles, for example. High pass filters 50, 51, 52 and 53 are selectively included in the logic of amplifilter 29 in accordance with traffic conditions. A relay D is connected in a conventional manner to the selected high pass filter and is energized in response to the five kilocycle frequency of the local oscillator in the amplifilter 29. The relay D picks up, energizing relay DP, which causes its contact 50a to open thereby quenching the local oscillator which deenergizes the relay D, which in turn drops out the relay DP. This intermittent picking up and dropping away of the relays D and DP continues as long as the locomotive is traveling within the speed limits commanded by the system.

The output of the frequency generator 26 is also applied in a well known manner through the amplifilter 29 to a selected one of the high pass filters 50, 51, 52 and 53. As long as this speed frequency is below the cut off value of the selected high pass filter 50, 51, 52, or 53, or in other words below the commanded speed, the cycling of the relay D and DP is not affected. When the train exceeds the commanded limit, the axle generator output frequency goes above cut off, thereby maintaining the relay D constantly energized to halt the cycling operation. The selection of the filters 50 through 53 is governed by the decoding relays 75RP, 120RP and 180RP, respectively. The filter 52, which is cut into the system only when the locomotive is receiving a one-hundred eighty code-rate does not restrict the speed of the train as long as the 180 code rate is being received, but compares the actual speed of the train with the freight train authorized maximum speed to register, by the selective control of a relay GM, when a train is exceeding a 50 m.p.h. speed at a time when a restrictive indication is received and the code rate is reduced. The operation of the relay GM to store registration of this condition will be hereinafter considered.

A relay C is provided to be energized in response to the cycling of the relay DP, which occurs whenever the locomotive is not exceeding its restrictive speed as governed by the respective filter 50, 51 and 53 or the predetermined authorized maximum speed of fifty miles per hour as governed by the filter 52.

A relay MD is connected in a well known manner to the amplifilter 29 so that it is picked up whenever the frequency generator 26 is providing an output frequency, or in other words whenever the locomotive 20 is in motion.

The apparatus detecting the type of train being pulled by the locomotive includes a relay PM which is connected through a 60 m.p.h. amplifilter 56 to the amplifilter 29. The speed frequency signal is amplified, and as long as the frequency is below the 60 m.p.h. cut-off valve, the amplifilter 56 provides an output to maintain the relay PM picked up. This amplifilter 56 is designed so that whenever the speed frequency of the generator 26 indicates that the locomotive reaches 60 miles per hour, for example, it reduces its output to cause the relay PM to drop away. A relay P is held energized when the relay PM is picked up; and once the relay PM drops away, the relay P is deenergized and cannot thereafter be picked up until the relay MD is deenergized, or in other words until the locomotive comes to a stop. The dropped away position of the relay P determines the fact that the train has exceeded this predetermined speed limit and therefore is detected as being a passenger train. The relay PM, however, may pick up after having been dropped away if the authorized code-rate of one hundred eighty is being received so that the actual speed of the train may be compared with sixty miles per hour limit. In the event that the train is traveling in excess of this speed when a restrictive code rate is received, the relay PM cannot pick up until the train has slowed down to its required restricted speed.

A relay GM is provided to be energized by the relay C whenever a train is not exceeding its required speed. If the train is not exceeding fifty miles per hour while receiving the one hundred eighty or authorized code-rate just prior to a reduction in the code rate, the relay C is in its picked up position, and thus the relay GM is energized at the time when the rate changes. The closure of back contact 111 of relay 180 RP maintains relay GM picked up even through the relay C may drop away as is more fully hereinafter considered when considering the mode of operation upon passage of a train. Thus the condition of the relay GM, after cessation of a 180 code rate, registers whether or not the train speed was above 50 m.p.h. at the time of the code rate reduction.

If the relay P is picked up and the relay GM is dropped away at the time the locomotive is required to reduce its speed, a penalty brake application is suppressed in response to a degree of braking such as a one and one-half atmosphere reduction in brake pipe pressure, which is adequate for a freight train traveling in excess of fifty miles per hour. If the relays GM and P are both picked up at the time the locomotive is required to reduce its speed, a penalty brake application is suppressed in response to a degree of braking such as a one atmosphere reduction in brake pipe pressure which is adequate for a freight train traveling at less than fifty miles per hour.

If the relays PM is picked up, and the relay P and GM are dropped away when the train is required to reduce its speed, a penalty brake application is suppressed in response to a one atmosphere reduction in brake pipe pressure which is adequate for a passenger train traveling less than sixty miles per hour but more than fifty miles per hour.

If both the relays GM and P are dropped away under these same circumstances, and the relay PM is dropped away, a degree of braking such one and one-half atmosphere reduction, which corresponds to a passenger train traveling sixty miles per hour or more, is required to suppress a penalty brake application.

A conventional electropneumatic valve EPV is connected in a well known manner so that when it is deenergized a penalty brake application occurs. The electropneumatic valve EPV is held normally energized by a slow acting relay SA which has a drop away time of approximately four or five seconds for example. The dropping away of the relay SA deenergizes the valve EPV. The relay SA is maintained energized any time that the train is receiving a one hundred eighty code-rate. When the one hundred eighty code-rate ceases, the relay SA is held energized depending upon the degree of braking required to suppress a penalty brake application.

The pressure switches 32 and 33, which are connected to the brake pipe 34, are connected by way of their contacts 35 and 36 in the circuitry which includes the contacts of the relays PM, P, and GM to maintain the relay SA energized under the conditions previously described.

A conventional reset contactor 60 is provided to pick up the relay SA after an automatic brake application. A contactor 64 is operated to energize a relay NSR and illuminate aspect NS of the cab signal 25 when the train is dispatched into non-signalled territory before reaching the coded territory as will be described in connection with its operation. The system is also provided with an audible overspeed warning device AO, which notifies the engineman when he is traveling in excess of a restricted speed.

In operation, and assuming that the train is waiting to be dispatched first over non-signalled territory before entering signalled territory, the contactor 64 is operated which picks up the relay NSR by a circuit that extends from (+) and includes back contact 72 of the relay 75R, back contact 73 of the relay 120R, back contact 74 of the relay 180R, closed contact 76 of the contactor 64, and the winding of the relay NSR to (—). The relay NSR is held energized after the release of the contactor 64 by a stick circuit which extends from (+) and includes the back contacts 72, 73 and 74 of the relays 75R, 120R and 180R respectively, back contact 77 of the relay 270R, normally closed contact 78 of the acknowledging contactor 42, front contact 80 of the relay NSR, and the winding of the relay NSR to (—). The reset contactor 60 is then operated to pick up the relay SA to energize the electropneumatic valve EPV by an obvious circuit. The circuit for picking up the relay SA extends from (+) and includes back contact 81 of the relay 270R, back contact 82 of the relay 75RP, back contact 83 of the relay 120RP, back contact 84 of the relay 180RP, front contact 86 of the relay NSR, back contact 87 of the relay MD, wire 88, closed contact 90 of the reset contactor 60, the upper and lower windings of the relay SA, closed contact 91 of the contactor 64, and closed contact 92 of the acknowledging contactor 42 to (—). The relay SA is held energized by a stick circuit which extends from (+) and includes the back contacts 81, 82, 83 and 84 of the relays 270R, 75RP, 120RP and 180RP, respectively, front contact 86 of the relay NSR, front contact 93 and the winding of relay SA, through contacts 91 and 92, to (—). The picking up of the relay NSR also energizes the aspect NS of the cab signal 25 by an obvious circuit.

The brakes are now released and the train may get under way. When the train first starts in motion, the relay MD picks up as previously described to illuminate the aspect MD in the cab signal 25. The picking up of the MD relay also opens the obvious pick up circuit for the relay P at back contact 94 of the relay MD so that the relay P is held energized by a stick circuit which extends from (+) and includes front contact 95 of the relay PM, front contact 96 of the relay P, and the winding of the relay P to (—). The back contact 87 of the relay MD in the previously described pick up circuit for relay SA is opened so that the relay SA is now held energized by its previously described stick circuit.

The relays D and DP continue cycling in response to the frequency from the generator 26 and the operation of the amplifilter 29 as previously described. The relay C is picked up in response to the cycling of the relay DP by a circuit which includes contacts 97 and 98 of the relay DP together with capacitors 100 and 101 which are alternately charged through resistor 102 and discharged through the winding of the relay C to maintain the relay C picked up. Because there is no code received from the track in non-signalled territory, the high pass filter 53 is cut into a circuit of the amplifilter 29 by a circuit which includes back contacts 103 and 104 of the relay 75RP, back contacts 105 and 106 of the relay 120RP, and back contacts 107 and 108 of the relay 180RP. As the train increases speed and reaches 21 miles per hour, the relay D and the relay DP stop cycling thereby causing the relay C to drop away. However, because the relay NSR is energized the operation of the relay has no effect on the operation of the relay SA. The relay GM is also picked up in response to the picking up of the relay C as the train gets underway by a circuit which extends from (+) and includes front contact 110 of the relay C. When the relay C drops away after reaching the speed when the train is governed by the filter 53, the relay GM is held energized by a stick circuit which extends from (+) and includes back contact 111 of the relay 180RP, front contact 112 of the relay GM, and the winding of the relay GM to (−).

Assuming that the locomotive 20 is traveling over track section 11 and its receiver 21 inductively couples with the loop 10, a relay 75RP, 120RP or 180RP is energized depending upon the aspect displayed by wayside signal 113 at the entrance to signalled territory. Assuming that the loop 10 is conducting a 180 code rate, which governs the train to travel at maximum authorized speed, the picking up of the relay 180RP opens its back contact 84 in the stick circuit for the relay SA. The picking up of the relay 180R opens its back contact 74 of the previously described stick circuit for the relay NSR. Without any action on the part of the engineman, the relay SA will drop away in approximately four to five seconds to de-energize the valve EPV and cause a penalty brake application. The relay NSR will drop away after an interval of six to eight seconds after the opening of the back contact 74 because of the time necessary for the capacitors 116 and 117 to discharge through the winding of the relay NSR.

However, if the engineman operates the acknowledging contactor 42 within four seconds after receiving that one hundred eighty code rate, the relay NSR is dropped away immediately, because the capacitor 117 in the stick circuit of the relay NSR is cut out when the contact 78 of the acknowledging contactor 42 opens. The dropping away of the relay NSR before the dropping away of the relay SA provides an alternate stick circuit for the relay SA to prevent a penalty brake application, which extends from (+) and includes back contacts 118 of the relay 270R, back contact 119 and 120 of the relays 75RP and 120RP, front contact 121 of the relay 180RP, back contact 122 of the relay NSR, the front contact 93 of the relay SA, the winding of the relay SA and the contacts 91 and 92 of the contactors 64 and 42 to (−).

The aspect G of the cab signal is illuminated in response to the dropping away of the relay NSR by a circuit which extends from (+) and includes back contact 123 of the relay 270R, back contacts 124 and 125 of the relays 75RP and 120RP, front contact 126 of the relay 180RP, and aspect G and back contact 127 of the relay NSR to (−). If the loop 10 had been conducting a more restrictive code rate, and the train had been travelling in excess of this restrictive speed, the horn AO would have sounded upon the dropping away of the relay NSR, and the train would have been slowed down as required by the system in the same manner as a more restrictive code-rate received in signalled territory as described hereinafter.

Assuming that the train has heretofore exceeded sixty miles per hour and had not come to a complete stop since that time, the relay PM would have caused the relay P to drop away by opening its previously described stick circuit indicating that the locomotive is pulling a passenger train. Assuming that the train identified as a passenger train is now travelling over fifty but less than sixty miles per hour on track section 12, while receiving a code rate of one hundred eighty, and track section 13 is energized by a code rate of one hundred twenty, the relay 120R and its repeater 120RP pick up when the locomotive receivers 21 leave track section 12 and reach track section 13. The relay C is dropped away because the train was travelling over track section 12 in excess of that determined by the filter 52. Thus, the stick circuit for the relay GM is not completed when back contact 111 of the relay 180RP closes. In response to the picking up of the relay 120RP, the audible over-speed horn AO sounds by a circuit which extends from (+) and includes the back contact 118 of the relay 270R, the back contact 119 of the relay 75RP, the front contact 120 of the relay 120RP, back contact 128 of the relay C, and the energizing winding of the horn AO to (−). Without any further action on the part of the engineman, the relay SA will drop away in approximately four to five seconds after the picking up of the relay 120RP because its stick circuit is broken at back contact 120 of the relay 120RP. The dropping away of the relay SA causes a penalty brake application. When the code-rate changes to one-hundred twenty, and before the relay SA drops away, the engineman is required to operate the brake lever 37 to position 38 to reduce the pressure in the brake line one atmosphere for slowing the train to its restrictive required speed. This reduction of one atmosphere in the brake pipe 34 causes the contact 35 of the differential pressure switch 32 to close thereby maintaining the relay SA energized, by a circuit which extends from (+) and includes contact 35 of the pressure switch 32, front contact 130 of the relay PM, back contact 131 of the relay P, the front contact 93 of the relay SA and the winding of the relay SA to (−). When the speed of the train has been reduced to the required speed, which in this embodiment is forty-five miles per hour, the relay C again is energized to apply energy to the relay SA through the front contact 128 of the relay C, and the engineman may release the brake lever 37. At the time this one-hundred twenty code-rate was received the engineman was warned of this change by the illumination of the aspect Y/G of the cab signal 25 by an obvious circuit which included the front contact 125 of the relay 120RP.

If this train, which was identified as a passenger train by the system, is exceeding sixty miles per hour at the time the one hundred twenty code-rate is received the engineman is required to reduce the pressure in the brake pipe one and one-half atmosphere in order to complete a circuit for applying energy to the relay SA. This circuit extends from (+) and includes contact 36 of the pressure switch 33, the back contact 130 of the relay PM, the back contact 131 of the relay P, and the front contact 93 of the relay SA.

Assuming that the train is travelling between fifty and sixty miles per hour but had never reached a speed of sixty miles per hour since last starting up, and thus was identified as a freight train, the relay GM is dropped away, the relays PM and P are both picked up at the time the more restrictive code rate is received. An adequate degree of braking under these circumstances is a one and one-half atmosphere reduction, and the relay SA is held energized by a circuit which extends from (+) and includes closed contact 36 of the pressure switch 33, back contact 136 of the relay GM, front contact 131 of the relay P, and the remainder of the stick circuit of the relay SA as previously described.

Assuming that this train, identified as a freight train is travelling less than fifty miles per hour but over forty-five miles per hour at the instant the authorized code rate ceases and the one hundred twenty code rate is received, the relay GM, which is energized through the front contact 110 of the relay C, is held energized by the back contact 111 of the 180RP, when the relay C drops away. The engineman, in this example, is required to apply a degree of braking adequate to reduce the pressure in the brake pipe by only one atmosphere even though the train was identified as a freight train, because it was not exceeding its authorized limit of fifty miles per hour at the time the code-rate changed. The circuit for maintaining the relay SA energized in this example extends from (+) and includes the front contact 35 of the pressure switch 32, the front contact 136 of the relay GM, the front contact 131 of the relay P, and the remainder of the SA stick circuit as heretofore described.

The relay GM is held energized once the relay 180 drops away for any subsequent changes to a more restrictive code-rate so that the stick circuit for the relay SA is completed through the contact 35 of the one atmosphere pressure switch 32. It should be noted that when the relay PM is dropped away indicating the train is travelling sixty miles per hour or over, for example, and the code-rate of one hundred eighty changes dropping the relay 180RP to open its front contact 138, that the relay PM cannot pick up even though the locomotive should slow down to less than sixty miles per hour as long as it is travelling above the speed authorized by the restrictive code rate received. This prevents a passenger train travelling in excess of sixty miles per hour from braking only one-atmosphere after it slows down below sixty while receiving a restrictive control. Thus, the adequate degree of braking is determined at the instant the more restrictive code rate is received both for a passenger and freight train. However, once a passenger train has slowed down to the authorized speed, the relay C closes its front contact 140 and the relay PM can pick-up so that a one-atmosphere reduction in brake pipe pressure is sufficient to suppress a penalty application by the circuit previously described.

When no code is being received by the locomotive carried equipment in signalled territory, the train must be travelling below 21 miles per hour in order to prevent a penalty brake application. The circuit for maintaining the relay SA energized under no-code conditions extends from (+) and includes the back contacts 118, 119 and 120 and 121 of the relays 270R, 75RP, 120 RP and 180RP respectively and back contact 142 of the relay NSR, the front contact 128 of the relay C, and the remainder of the previously described stick circuit for the relay SA. If the train were travelling at or above this speed of 21 miles per hour the front contact 128 of the relay C is open and the back contact 128 is closed causing the audible over-speed horn AO to sound and open the stick circuit for the relay SA. The engineman is required to apply a degree of braking to reduce the atmosphere in the brake line depending on the speed the train is travelling at the time the authorized code-rate ceased as described in the preceding examples of operation.

Each time the train comes to a complete stop, the relay MD drops away causing the relay P to pick up by the previously described circuit, and in order for the train to be identified as a passenger train it must again reach or exceed the speed of sixty miles per hour.

When the locomtive leaves the signalled or coded territory, illustrated by track section 15 of FIG. 1 the locomotive receivers 21 are influenced by the loop 14 which has a current that is interrupted at a two hundred seventy code rate. In response to the reception of the two hundred seventy code rate, the cab signal aspect NS is illuminated by the closing of the front contact 123 of the relay 270R. The relay SA is held energized through the front contact 118 of the relay 270R. While the train is progressing over the loop 14, and before it reaches the end of the loop 14, the engineman is required to operate the acknowledging contactor 42 which picks up the relay NSR by a circuit that extends from (+) and includes the back contact 72, 73, and 74 of the relays 75R, 120R and 180R respectively the front contact 77 of the relay 270R, closed contact 141 of the acknowledging contactor 42, and the winding of the relay NSR to (−). If the acknowledging contactor 42 is not operated while receiving the two hundred seventy code-rate, the train will be required to reduced speed in the same manner as if a no-code were received in signalled territory. Once the relay NSR is picked up by the operation of the acknowledging contact 42, back contact 142a of relay NSR opens to deenergize the decoder and drop the relay 270R. The release of the contactor 42 sticks the relay NSR by a circuit which includes the front contact 78 of the contactor 42 and front contact 80 of relay NSR. The picking up of the relay NSR in effect locks out the train control apparatus by permitting the train to travel unrestricted in the absence of a code being received from the track rails.

Although one embodiment of the invention has been shown and described in connection with a system employing a number of different code rates for control of the train and high pass filters 50 through 53 to command the train in accordance with certain specified speeds, it is apparent that more or less codes and more or less commands at other specified speeds may be used for controlling the locomotive depending upon the requirements of practice. Although two specific degrees of braking are shown and described, it is understood that other degrees of braking and different reductions in atmospheric pressure may be sensed according to the needs of practice. Although a lesser degree of braking has been described for a passenger train, at certain speeds, it is understood that such a degree of braking may also be appropriate for a short light freight train having similar braking characteristics.

Having thus described the invention in connection with one specific embodiment, it is understood that various modifications, and adaptations may be made without departing from the spirit or the scope of the invention as defined in the claims.

What is claimed is:

1. In a train control system wherein a plurality of controls are transmitted selectively to vehicle carried apparatus to govern the train at selected rates of speed, one of said controls governing the train at a restrictive rate of speed and another of controls governing the train to travel at authorized speed and having means for causing a penalty brake application in response to the reception by the vehicle carried apparatus of the one control when the train is traveling at a rate of speed in excess of the restrictive speed, comprising a first detecting means on the vehicle to detect the speed of the train in excess of a first predetermined rate while the vehicle is receiving the other control, a second detecting means on the vehicle to detect the speed of the train above a second predetermined rate which speed is faster than the first predetermined rate, a first storing means on the vehicle governed by the first detecting means emergized in response to a detected speed of the vehicle above the first predetermined rate in response to the cessation of the other control, a second storing means on the vehicle deenergized in response to the detected speed of the vehicle by the second detecting means to store the detected speed of the train traveling above the second predetermined rate, means on the vehicle for applying selected degrees of braking to slow the train, a first suppression means governed by the first and second storing means in an energized condition to suppress a penalty brake application in response to one selected degree of braking when the train is traveling above the first predetermined rate and below the second predetermined rate upon the reception of the one control, and a second suppression means governed by the first storing means in a deenergized condition and the second storing means in an energized condition to suppress a penalty brake application in response to another selected degree of braking when the train is traveling above the first predetermined rate and below the second predetermined rate upon the reception of the one control.

2. In a train control system according to claim 1 wherein the other degree of braking is greater than the one degree of braking.

3. In a train control system according to claim 1 wherein the means for applying selected degrees of braking includes means for reducing the brake pipe pressure commensurate with the degree of braking selected, and the first and second suppressing means each includes a differential pressure switch in communication with the pressure in the brake-pipe having a contact that is closed in response to the one and the other selected degree of braking respectively.

4. In a train control system having means for providing a penalty brake application in response to the reception of a restrictive speed control when the train is travelling at a speed in excess of the speed required by the restrictive control, comprising first means to detect the attained speed of the train above a first predetermined maximum since last getting underway, second means to detect the speed of the train above a second predetermined maximum upon the reception of the restrictive control, means for applying a selected degree of braking to the train, first circuit means governed by the first and second detecting means when the train is detected travelling above the first authorized speed upon the reception of the restrictive control to forestall a penalty brake application in response to a first selected degree of braking by the brake applying means, second circuit means governed by the first and second detecting means when the train is detected as having exceeded the first authorized maximum speed and is detected exceeding the second authorized speed and travelling below the first authorized speed at the instant the restrictive control is received to forestall a penalty brake application in response to a second selected degree of braking, and third circuit means governed by the first and second detecting means to forestall a penalty brake application upon the reception of the restrictive control when the train has not reached the first authorized speed and is travelling below the second authorized speed in response to the said second degree of braking, said second degree of braking being greater than the first degree of braking.

5. Vehicle carried apparatus for a train control system, comprising in combination, means for receiving first and second codes, a first command means activated in response to a first of the codes to govern the train at a first predetermined rate of speed, a second command means activated in response to a second of the codes to govern the train at a second predetermined rate of speed, speed comparing means governed by the actual speed of the train and operated to one position when the speed exceeds the speed commanded by the particular activated speed command means and operated to its other position when the speed of the train is less than the particular activated speed command means, electro-pneumatic valve means when energized operative to hold the brakes of the train in a released condition and when deenergized operative to apply the brakes to stop the train, circuit means governed by the reception of the first code to energize the valve means, means to apply a selected degree of braking to slow the train, means to detect the momentary speed of the train above a third predetermined rate of speed, said third rate of speed being greater than the first and second rate, means operative to detect when the train is in motion, first means operative to store the momentary detected speed of the train above the third predetermined rate during the time the motion detecting means detects the train in motion, second means operative to store the speed above the third predetermined rate at the instant the receiving means ceases receiving the first code, third means to store the speed of the train above the first predetermined rate at the instant the receiving means ceases receiving the first code, a first circuit means including the first and second storing means detecting the speed of the train above the third predetermined rate to energize the valve means upon the change from reception of the first code to the second code in response to one selected degree of braking to slow the train, second circuit means including the first storing means momentarily detecting the speed of the train above the third predetermined rate, but between the first and third predetermined rate upon the change from reception of the first code to the second code to energize the valve means in response to a lesser degree of braking than the one degree of braking.

6. The combination according to claim 5 further including circuit means when closed for energizing the valve means when no code is received prior to the reception of the first and second codes, means effective to open the valve energizing circuit means upon reception of one of the first or second codes, acknowledging means, and means responsive to the operation of the acknowledging means to render ineffective the means for opening the valve energizing circuit means within a predetermined time after the reception of the first or second code.

7. The combination according to claim 5 further including means for receiving a locking code, means responsive to the reception of the locking code and the operation of the acknowledging means operative to render the valve energizing circuit means closed upon the cessation of the locking code.

References Cited by the Examiner
UNITED STATES PATENTS

| | | | |
|---|---|---|---|
| 1,794,582 | 3/1931 | Bushnell | 246—189 |
| 2,112,421 | 3/1938 | Masterman | 303—18 |
| 2,632,844 | 3/1953 | Hughson | 246—182 |
| 2,958,561 | 11/1960 | May | 303—8 |
| 3,076,681 | 2/1963 | Erson et al. | 303—18 |

ARTHUR L. LA POINT, *Primary Examiner.*

S. B. GREEN, *Assistant Examiner.*